United States Patent [19]

Gumprecht

[11] Patent Number: 4,960,742

[45] Date of Patent: Oct. 2, 1990

[54] SPENT ANTIMONY HALIDE CATALYSTS TREATMENT

[75] Inventor: William H. Gumprecht, Wilmington, Del.

[73] Assignee: E. I. Du Pont de Nemours and Company, Wilmington, Del.

[21] Appl. No.: 262,637

[22] Filed: Oct. 26, 1988

[51] Int. Cl.$^5$ .................... B01J 38/54; C01G 30/00; C22B 30/02; B08B 9/08

[52] U.S. Cl. .................... 502/24; 134/22.14; 134/22.19; 423/87; 502/32

[58] Field of Search .................... 502/24, 32; 423/87; 570/167; 134/22.14, 22.19

[56] References Cited

U.S. PATENT DOCUMENTS

| | | | |
|---|---|---|---|
| 2,749,375 | 6/1956 | Ruk et al. | 570/167 |
| 4,005,176 | 1/1977 | Fernschild et al. | 423/87 |
| 4,343,745 | 8/1982 | Soula | 556/95 |
| 4,722,774 | 2/1988 | Hyatt | 423/87 |
| 4,751,063 | 6/1988 | Kalcevic et al. | 423/87 |

*Primary Examiner*—Paul E. Konopka

[57] ABSTRACT

A process is disclosed for dissolving and dispersing spent antimony halide catalysts by contact with methylene chloride.

5 Claims, No Drawings

SPENT ANTIMONY HALIDE CATALYSTS TREATMENT

BACKGROUND OF THE INVENTION

In modern society, chlorofluorocarbons are widely used in chemical, electronic and appliance industries as solvents, cleaning agents, refrigerants, blowing agents for solid foams and the like. These chlorofluorocarbons are most often made by processes which utilize antimony halide catalysts. Typically the reactions to produce these chlorofluorocarbons are between chlorinated hydrocarbons and hydrogen fluoride in the presence of these antimony halide catalysts.

As is the case with any catalytic process, in time the catalytic activity is reduced to such a level that the process becomes uneconomical. The spent catalyst must then be removed from the reaction vessel and replaced with fresh catalyst.

Typically, spent antimony halide catalysts comprise antimony pentachloride, antimony trichloride, antimony trifluoride, various antimony chlorofluorides, arsenic chloride, arsenic fluorides, iron chloride, hydrogen fluoride, hydrogen chloride, chlorinated hydrocarbons and chlorofluorinated hydrocarbons. Because of the very toxic and corrosive nature of the spent antimony halide catalysts, great care must be taken in handling them, either to recover the catalyst by regeneration or to treat them for safe disposal. Thus, any treatment of the spent antimony halide catalysts must be in a carefully controlled environment wherein any acidic and/or toxic substance released must be captured and rendered safe to handle. If a desired treatment of the spent catalyst is hydrolysis to render the antimony and arsenic halides more amenable to handling safely, such hydrolysis must be carried out with minimal corrosion of any vessel.

In the normal operation in the manufacturing processes for chlorofluorocarbons using antimony halide catalysts, particularly in any large scale manufacturing, these spent catalysts are removed from reaction vessels and stored in containers such as railroad tank cars or tank trucks which can be used to transport the spent catalysts to a separate location for recovery of the catalyst values or treatment for disposal. Storage of spent catalysts until sufficient quantities are accumulated for transport to the recovery or disposal area results in precipitation and settling of a portion of the spent catalysts, making it very difficult to extract them out from the storage vessels. The hazardous nature of the spent catalysts precludes removing the catalysts manually from the containers.

This handling of partially solidified spent catalysts in storage tanks and in particular the extraction of the spent catalysts from the storage tanks into suitable equipment for the regeneration or for treatment for proper disposal has been a problem for some time.

It is therefore an object of the present invention to provide means to facilitate removal of spent antimony halide catalysts from storage tanks. It is a further object of the present invention to provide improvement in a process for recovery or disposal of spent antimony halide catalysts by providing a means to facilitate transfer of spent antimony halide catalysts from storage tanks to processing equipment for said recovery or disposal.

SUMMARY OF THE INVENTION

A process has been discovered for treating spent antimony halide catalysts prior to regeneration or disposal comprising contacting said spent catalysts with an amount of methylene chloride effective to dissolve and/or disperse the spent antimony halide catalyst.

More particularly, the present invention relates to an improvement in a process of treating spent antimony halide catalysts for regeneration or for disposal wherein by the step of contacting said spent antimony halide catalysts with sufficient methylene chloride such that the spent catalysts become fluidized and the feasability and safety of handling the spent antimony halide catalyst are enhanced.

DETAILED DESCRIPTION OF THE INVENTION

The spent antimony halide catalysts to which the present invention process applies are derived for the most part from the manufacture of chlorofluorocarbons including trichloromonofluoromethane, dichlorodifluoromethane, dichloromonofluoromethane, monochlorodifluoromethane, trichlorotrifluoroethane, dichlorotetrafluoroethane and the like. The manufacturing process usually involves hydrofluorination, with hydrogen fluoride, of lower chloroalkanes or chloroalkenes such as chloroform, carbon tetrachloride, tetrachloroethane, hexachloroethane, tetrachloroethylene and the like in the presence of antimony halide catalysts ($SbCl_5$, $SbCl_3$, $SbCl_4F$, $SbCl_3F_2$, etc.). In the context of the present invention, spent antimony fluoride catalysts relate primarily to antimony halides used in the manufacture of chlorofluorocarbons although the present invention is equally applicable to spent antimony halide catalyst from other reactions. The process of the present invention does not relate to the use of antimony halide catalysts but does relate to an improvement in a process of detoxifying, regeneration or disposal of spent antimony halide catalysts.

Spent antimony halide catalysts are usually dark-colored solids with offensive odor and contain various amounts of liquid. They are corrosive, toxic, and generate dense white fumes on exposure to moist air or water. They usually are mixtures of various antimony halides including antimony pentachloride, antimony trichloride, several of the antimony chlorofluorides, arsenic chloride and fluorides, chlorinated hydrocarbons and chlorofluorinated hydrocarbons. Depending upon their sources, spent antimony halide catalysts will typically contain from about 5% to 75% antimony pentachloride, from about 1% to 85% antimony trichloride, from about 0.5% to 15% arsenic chloride, from about 1% to 10% various antimony chlorofluorides, from about 5% to 30% halogenated hydrocarbons, of which about 20% to 30% may be chlorofluorocarbons. The characteristics of the spent antimony halide catalysts, containing significant amounts of solid sludges and being toxic and corrosive, make handling of these spent catalysts extremely difficult.

The present invention is based on the unexpected discovery that, as a result of treating spent antimony halide catalysts with sufficient methylene chloride, the spent catalysts become fluidized, and the safety and feasability of handling the spent catalysts are enhanced. It is believed that the methylene chloride both solubilizes the solid portions of the spent catalysts and disperses (fluidizes) the solid portion of the spent catalysts which are not dissolved in methylene chloride.

This invention is surprising since chloro homologues of methylene chloride, such as chloroform and carbon tetrachloride, are ineffective for this purpose. In addition, aromatic solvents such as toluene are also ineffective.

In carrying out the process of the invention, methylene chloride may be added as a liquid in any convenient method to the spent antimony halide catalysts. This can include adding the methylene chloride to the spent catalysts in the reaction vessel or in temporary storage vessels which may be railroad tank cars or tank trailers.

The amount of methylene chloride added is an amount effective to dissolve and/or disperse the spent antimony halide catalysts. By amount effective to dissolve and/or disperse the spent antimony halide catalysts is meant at least some methylene chloride and, preferably, the amount of methylene chloride can be from about 0.5 to about 2.0 parts by weight of methylene chloride per part by weight of spent catalysts. The total amount of methylene chloride may be added at once, but preferably it is added incrementally, say, one-third of the total amount of methylene chloride, allowing partial solubilization and dispersion of the spent catalysts to occur, then removing the methylene chloride layer, and repeating with the second one-third of the methylene chloride and so forth. As is usually the case, solubilization and dispersion are enhanced with increased temperature. Conveniently, methylene chloride may be used at any practical temperature, including from about 10° C. to about 40° C. Agitation of a mixture of spent catalysts and methylene chloride may also help solubilization and dispersion of the spent catalysts.

Methylene chloride containing dissolved and dispersed antimony halide catalysts is easily removed from reaction vessels or storage vessels by usual procedures such as blowing over into another vessel using positive inert gas pressure, siphoning, pumping and the like.

Methylene chloride containing dissolved and dispersed spent catalysts can then be safely stored, transported and treated in proper equipment under environmentally-controlled conditions to regenerate the catalyst for reuse or to detoxify for carefully-controlled disposal.

The process of the present invention therefore provides improvement in the handling of very toxic and corrosive spent antimony halide catalysts. Safe and easy handling of the spent catalysts made possible by the present invention should also make either the regeneration of the catalysts or detoxification for disposal safer and more efficient. Methylene chloride, with an atmospheric boiling point of 40.8° C., can be readily recovered from the spent catalysts, for example by distillation, for reuse.

EXAMPLE

A tank trailer used for temporary storage contained 9700 pounds of partially solidified spent antimony halide catalyst which had settled out. Analyses of a sample of the solid spent catalyst indicated the composition as 9.4% $SbCl_5$, 81.7% $SbCl_3$, 0.3% $AsCl_3$, 0.4% $FeCl_3$ and 8.2% miscellaneous.

A first batch of 450 gallons (5000 pounds) of methylene chloride at 30° C., was added to the trailer at the rate of about 10 gallons per minute. The trailer was then rocked back and forth about a dozen times to facilitate mixing and dissolution. Methylene chloride containing dissolved and dispersed spent catalyst was transferred to another clean trailer by blowing over with nitrogen pressure. Weighing of the storage trailer indicated that 5580 pounds (57.6%) of the dissolved and/or dispersed spent catalysts was taken out of the storage trailer.

The process was repeated with a second batch of methylene chloride (450 gallons, 5000 pounds) with an additional 1780 pounds (18.4%) of the dissolved and/or dispersed spent catalyst being removed from the storage trailer.

With a third batch of methylene chloride (270 gallons, 3000 pounds) an additional 2160 pounds (22.3%) of the dissolved and/or dispersed spent catalyst was removed from the storage trailer using the procedure as described above.

Thus, by the process of the present invention, of 9700 pounds of spent antimony halide catalysts in the storage trailer, 9520 pounds or 98.3% was removed from the storage trailer without operational or safety difficulties. The remaining 180 pounds in the storage trailer (1.7% of the original) was removed by flooding the storage trailer with water and caustic.

I claim:

1. A process for treating spent antimony halide catalysts preparatory to regeneration or disposal comprising contacting said spent catalysts with an amount of methylene chloride effective to dissolve and/or disperse the spent antimony halide catalyst, said spent antimony halide catalysts comprising mixtures of antimony pentachloride, antimony trichloride, antimony chlorofluorides, arsenic chloride and fluorides, chlorinated hydrocarbons, chlorofluorinated hydrocarbons and corrosion products, and thereafter,
recovering or disposing of said dissolved and/or dispersed spent antimony halide catalyst.

2. Process of claim 1 wherein said effective amount of methylene chloride is from about 0.5 to about 2.0 parts by weight per part by weight of said spent catalysts.

3. The process of claim 1 wherein said spent catalysts is contacted with methylene chloride in the temperature range of from about 10° C. to about 40° C.

4. The process of claim 1 wherein the spent antimony halide catalysts and methylene chloride are agitated during the contacting step.

5. The process of claim 1 wherein the contacting step is repeated to dissolve and disperse any undissolved and/or undispersed spent antimony halide catalyst remaining after the contacting step of claim 1.

* * * * *